United States Patent Office 2,745,683
Patented May 15, 1956

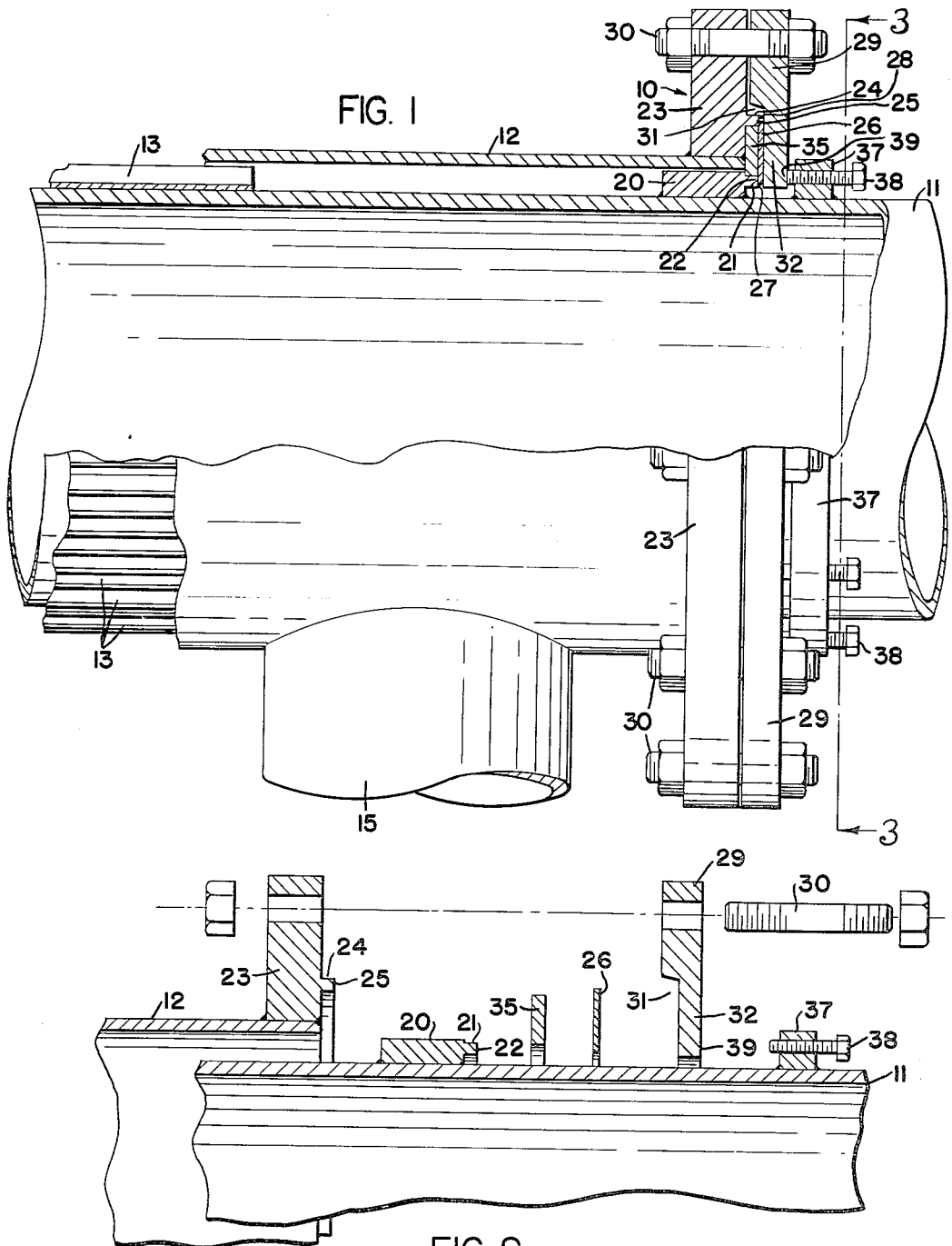

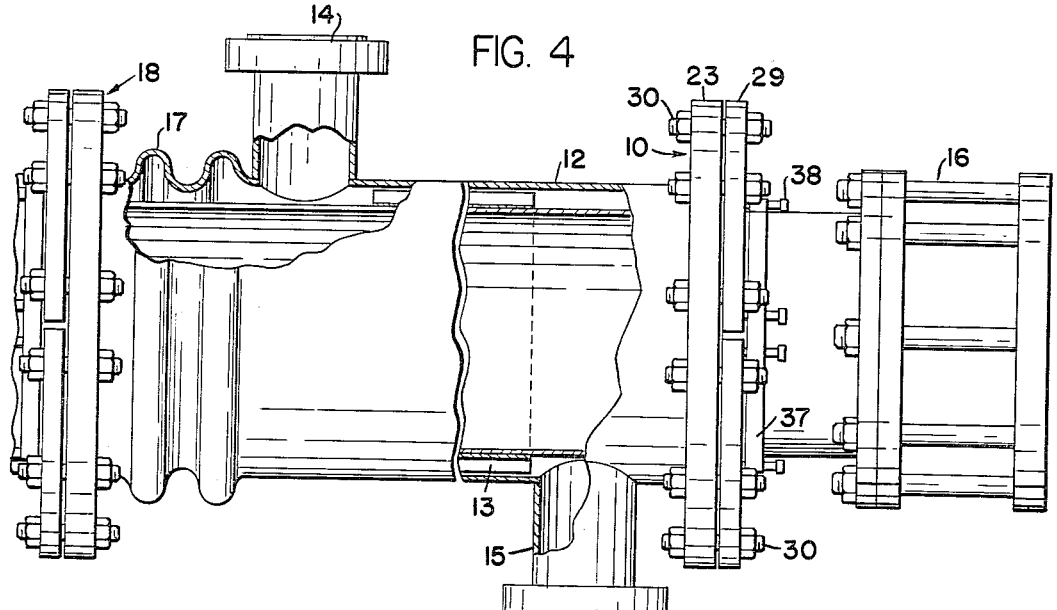
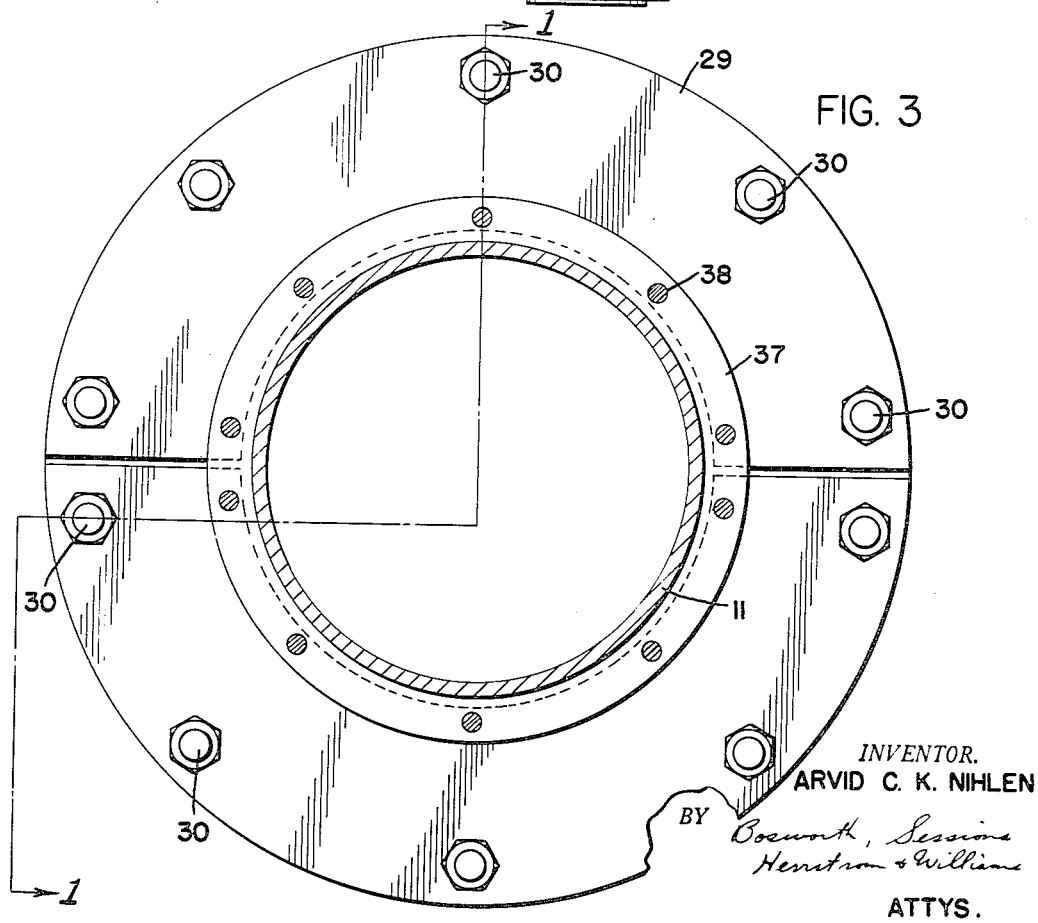
INVENTOR.
ARVID C. K. NIHLEN
BY Bosworth, Sessions Herrstrom & Williams
ATTYS.

2,745,683

CONNECTING MEANS FOR CONCENTRIC PIPES

Arvid C. K. Nihlen, Oberlin, Ohio, assignor to Brown Fintube Company, Elyria, Ohio, a corporation of Ohio Application April 3, 1953, Serial No. 346,597

4 Claims. (Cl. 285—22)

This invention relates to connections or fittings for joining two tubes or pipes of different diameters, and more particularly to connections that will be completely leakproof in service. The connections or fittings are adapted especially for services where leakage cannot be tolerated and for services where severe operating conditions are encountered. In the present application, the invention is described as applied to a heat exchanger in the form of an indirectly-fired heater in which an oil burner or other source of heat is utilized to heat directly an inner tube, the material to be heated flowing around the circumference of the inner tube and within a shell tube, but it is to be understood that the invention may be adapted to other purposes and uses.

General objects of the invention are the provision of a leakproof connection for tubes or pipes of different diameters; the provision of a leakproof connection that is particularly adapted for severe operating conditions and particularly for high temperature service; the provision of a leakproof connection that will resist substantial mechanical forces; the provision of a connection or fitting which can be manufactured readily; the provision of a connection or fitting that can be easily disconnected and reconnected; and the provision of a connection or fitting that will be durable and leakproof throughout its life.

Further objects and advantages of the invention will become apparent from the following description of a preferred form thereof, reference being made to the accompanying drawings in which:

Figure 1 is an elevational view, partly in section, showing a connection or fitting embodying the invention as applied to a heat exchanger.

Figure 2 is an exploded view of the parts making up the connection of Figure 1.

Figure 3 is an end view of the connection of Figure 1 taken along the line 3—3 of Figure 1, and Figure 4 illustrates a typical form of an indirectly-fired heater to which the connections of the present invention are particularly adapted.

Referring now to the drawings, a connection or fitting embodying the invention which is indicated in general at 10 is shown as making a leakproof joint between an inner tube 11 and an outer or shell tube 12, which in the embodiment illustrated are composed of steel and constitute parts of the indirectly-fired heater illustrated in Figure 4. The inner tube 11 preferably is provided with external longitudinal fins 13 to give it extended surface area, and in the particular device illustrated by way of example, the material to be heated flows through the annular space between the tubes 11 and 12 from inlet 14 to outlet 15, while heat is supplied by an oil burner or other source of heat indicated in general at 16. Hot products of combustion from the burner flow through the inner tube 11 and are discharged at the end of the tube 11 opposite the burner to any convenient flue connection or the like (not shown). The end of the shell tube 12 away from the burner is provided with an expansion joint 17 in the form of, for example, a metal bellows welded to the tube 12 and to another connection or fitting 18 which may be similar to connection 10 in all material respects.

It is evident that high temperatures and severe operating conditions are encountered in devices of this type. There may be wide temperature differences between the inner tube and the shell tube and rather rapid temperature fluctuations; these result in differences in expansion and mechanical forces of substantial magnitude are imposed upon the connections. Furthermore if an inflammable material is being heated, it is essential that leakage be prevented absolutely because leakage of the inflammable material would create a serious fire hazard.

A connection that meets the requirements of this severe service is provided as shown particularly in Figures 1, 2 and 3 by welding to the inner or fintube 11 a steel collar or bushing 20 having an axially and outwardly projecting flange 21 provided with an annular, outwardly facing sealing surface 22. Collar 20 is disposed within the shell tube 12 adjacent the end thereof and has its counterpart on the shell tube in the form of an external steel flange 23 welded to the shell tube and having an axially and outwardly projecting flange 24 with an annular sealing surface 25 facing in the same direction as the sealing surface 22. The sealing surfaces 22 and 25 of the collar 20 and flange 23, respectively, preferably lie in substantially the same plane as shown. The seal is made by welding or otherwise bonding to the respective sealing surfaces an annular sealing ring 26 formed of comparatively light gauge material, such as 18 gauge stainless steel, for example, the inner diameter of the sealing ring 26 being somewhat greater than the smaller diameter of the sealing surface 22 and the outer diameter of the ring being somewhat less than the larger diameter of the sealing surface 25 so that the welds 27 and 28 can be made conveniently.

By so welding the sealing ring to the sealing surfaces on the collar and flange an entirely leakproof connection between the tubes 11 and 12 is provided. This connection can be made readily and when it is necessary at infrequent intervals to disassemble the heater, the connection may be removed simply by chipping the sealing ring 26 and welds 27 and 28 away with a cold chisel. When the parts are reassembled, a new sealing ring is welded into place.

While the sealing ring with nothing more provides a leakproof connection, it cannot withstand either high fluid pressures or great mechanical forces unless made of comparatively heavy gage material that would be difficult to weld in place and remove. According to the present invention, the sealing ring is supported by the remaining structure so that it is subjected principally to forces in compression and, in general, does nothing more than make the fluid seal, the mechanical forces to which the assembly is subjected being taken to a great extent by the other parts.

To this end, a clamping ring 29, preferably split as shown in Figure 3, is secured to the flange 23 by studs 30 and is thus supported by the outer tube; the clamping ring is recessed as shown at 31 and dimensioned so that when it is clamped to the flange 23 the inwardly extending portion 32 of the ring engages and supports the outer surface of the sealing ring 26. Thus the clamping ring functions to support the sealing ring against internal fluid pressures and against forces tending to move the inner tube 11 to the right with respect to the outer tube 12 in Figure 1, such forces acting merely to place the sealing ring in compression. For some installations, such support for the sealing ring is all that is required; however, it is preferable also to support the inner side of the sealing ring 26 by an annular supporting washer 35 which is disposed in the annular space between the axially projecting flanges 21 and 24. This washer supports the sealing ring against external fluid pressure and other exteriorly applied forces; when the assembly is drawn up tight the washer supports the sealing ring so that forces tending to move the inner tube 11 to the left with respect to the shell tube 12 in the embodiment shown in Figure 1 cannot impose any substantial bending stresses on the sealing washer. Such forces, however, if only the parts described are employed, are resisted by the weld 27 between the projecting flange 21 and the sealing ring.

For particularly severe services, the imposition of these last forces to the weld 27 and sealing ring is prevented by means of a stop ring 37 welded to the exterior of the tube 11 immediately beyond the inwardly extending portion 32 of the clamping ring 29; the stop ring is threaded to receive clamping screws 38 which engage the outer surface 39 of the inwardly extending portion 32 of the clamping ring. When screws 38 are tightened against the clamping ring, the clamping ring is, in effect, clamped between the collar 20 and the stop ring 37, forces tending to move the inner tube 11 to the left with respect to the shell tube in Figure 1 are taken by the clamping screws with the result that in the complete assembly the sealing ring 26 and welds 27 and 28 are not subject to any substantial forces other than compressive forces. The sealing ring is firmly clamped between and supported by the inwardly extending portion 32 on the outer side thereof and the sealing surfaces 22 and 25 and the supporting washer 35 on the inner side thereof. The primary duty of the sealing ring is to make the required fluid tight seal; the mechanical forces are taken by the remaining elements of the connection; therefore, the sealing ring can be made of light gauge material which otherwise might not have sufficient strength to resist the forces applied to it, and, because of its light gauge, the sealing ring can be removed and replaced with little difficulty and at low cost.

From the foregoing description of a preferred form of the invention, it will be evident that I have provided a simple and effective connection for joining pipes or tubes of different diameters. The connection is absolutely leakproof and is particularly adapted to severe service conditions, such as high temperatures, rapidly and widely fluctuating temperatures, steep temperature gradients, corrosive materials and the like.

Those skilled in the art will appreciate that the connection may be adapted to purposes and uses other than the specific example given herein, and that various changes may be made in the connection specifically disclosed herein. For example, different materials, proportions and dimensions may be employed and the sealing ring may be bonded by soldering or brazing rather than welding if service conditions will permit. Accordingly, it is to be understood that the scope of the invention is defined by the appended claims.

I claim:

1. A tubular connection for joining an inner tube to an outer tube comprising a collar welded to the exterior of the inner tube and disposed within the outer tube adjacent one end thereof, an external flange welded to the outer tube adjacent said end thereof, said external flange having an axially projecting annular flange having an outwardly facing annular sealing surface thereon, said collar having an axially projecting annular flange having an outwardly facing annular sealing surface thereon, said flange on said collar being disposed within said axially projecting flange on said external flange, the sealing surfaces on said axially projecting flanges being disposed in substantially the same plane, an annular sealing ring welded to said sealing surfaces and spaced from the end surfaces of said external flange and said collar between said sealing surfaces, an annular supporting washer disposed within and substantially filling the space between the inner surface of said sealing ring and said end surfaces of said external flange and collar and engaging substantially the entire inner surface of said sealing ring, a clamping ring secured to said external flange and having a recessed portion receiving said sealing ring and providing an inwardly facing surface engaging and supporting substantially the entire external surface of said sealing ring and clamping said sealing ring against said sealing surfaces, a stop ring secured to the exterior of said inner tube adjacent the outer surface of said clamping ring and clamping screws mounted in said stop ring and engaging the outer surface of said clamping ring to prevent relative movement between said inner tube and said outer tube.

2. A tubular connection for joining an inner tube to an outer tube comprising a collar welded to the exterior of the inner tube and disposed within the outer tube adjacent one end thereof, an external flange welded to the outer tube adjacent said end thereof, said external flange having an axially projecting annular flange having an outwardly facing annular sealing surface thereon, said collar having an axially projecting annular flange having an outwardly facing annular sealing surface thereon, said flange on said collar being disposed within said axially projecting flange on said external flange, the sealing surfaces on said axially projecting flanges being disposed in substantially the same plane, an annular sealing ring welded to said sealing surfaces and spaced from the end surfaces of said external flange and said collar between said sealing surfaces, an annular supporting washer disposed within and substantially filling the space between the inner surface of said sealing ring and said end surfaces of said external flange and collar and engaging substantially the entire inner surface of said sealing ring, a clamping ring secured to said external flange and having a recessed portion receiving said sealing ring and providing an inwardly facing surface engaging and supporting substantially the entire external surface of said sealing ring and clamping said sealing ring against said sealing surfaces.

3. A tubular connection for joining an inner tube to an outer tube comprising a collar secured to the exterior of the inner tube and disposed within the outer tube adjacent one end thereof, an external flange secured to the outer tube adjacent said end thereof, said external flange having an axially projecting annular flange having an outwardly facing annular sealing surface thereon, said collar having an axially projecting annular flange having an outwardly facing annular sealing surface thereon, said flange on said collar being disposed within said axially projecting flange on said external flange, the sealing surfaces on said axially projecting flanges being disposed in substantially the same plane, an annular sealing ring bonded to said sealing surfaces and spaced from the end surfaces of said external flange and said collar between said sealing surfaces, an annular supporting washer disposed within and substantially filling the space between the inner surface of said sealing ring and said end surfaces of said external flange and collar and engaging substantially the entire inner surface of said sealing ring, and clamping means supported by said outer tube and having an inwardly facing surface engaging and supporting substantially the entire external surface of said sealing ring and clamping said sealing ring against said sealing surfaces.

4. A tubular connection for joining an inner tube to an outer tube comprising a collar secured to the exterior of the inner tube and disposed within the outer tube adjacent one end thereof, an external flange secured to the outer tube adjacent said end thereof, said external flange having an axially projecting annular flange having an outwardly facing annular sealing surface thereon, said collar having an axially projecting annular flange having an outwardly facing annular sealing surface thereon, said flange on said collar being disposed within said axially projecting flange on said external flange, the sealing surfaces on said axially projecting flanges being disposed in substantially the same plane, an annular sealing ring bonded to said sealing surfaces and spaced from the end surfaces of said external flange and said collar between said sealing surfaces, an annular supporting washer disposed within the space between the inner surface of said sealing ring and said end surfaces of said external flange and collar and engaging and supporting substantially the entire inner surface of said sealing ring, a clamping ring secured to said external flange and providing an inwardly facing surface engaging and supporting substantially the entire external surface of said sealing ring and clamping said sealing ring against said sealing surfaces, and means supported by said inner tube and engaging the outer surface of said clamping ring to prevent relative movement between said inner tube and said outer tube.

References Cited in the file of this patent

UNITED STATES PATENTS

| | | |
|---|---|---|
| 1,937,239 | McWane | Nov. 28, 1933 |
| 2,234,785 | Tolman | Mar. 11, 1941 |
| 2,424,221 | Brown | July 22, 1947 |
| 2,449,052 | Brown | Sept. 14, 1948 |

FOREIGN PATENTS

| | | |
|---|---|---|
| 386,014 | Great Britain | Jan. 12, 1933 |